United States Patent [19]

Eaton

[11] Patent Number: 5,710,808
[45] Date of Patent: Jan. 20, 1998

[54] TELEPHONE DIALLING CODE PROCESSOR

[76] Inventor: Mark William Eaton, 143 Melrose Road, Mt Roskill, Auckland, New Zealand

[21] Appl. No.: 501,052
[22] PCT Filed: Feb. 23, 1994
[86] PCT No.: PCT/NZ94/00013
  § 371 Date: Aug. 11, 1995
  § 102(e) Date: Aug. 11, 1995
[87] PCT Pub. No.: WO94/19896
  PCT Pub. Date: Sep. 1, 1994

[30] Foreign Application Priority Data

Feb. 25, 1993 [NZ] New Zealand ............. 247003

[51] Int. Cl.$^6$ ..................................... H04M 1/66
[52] U.S. Cl. .............. 379/201; 379/200; 379/213; 379/355
[58] Field of Search .................. 379/355, 354, 379/216, 207, 201, 211, 156, 200, 213, 188, 189

[56] References Cited

U.S. PATENT DOCUMENTS

| | | |
|---|---|---|
| 3,829,616 | 8/1974 | Blouch . |
| 3,851,109 | 11/1974 | Downs et al. ............ 379/200 |
| 4,791,667 | 12/1988 | Havel ..................... 379/361 |
| 4,817,136 | 3/1989 | Rhoads .................... 379/357 |
| 4,866,762 | 9/1989 | Pintar ..................... 379/188 |
| 4,945,557 | 7/1990 | Kaneuchi et al. .......... 379/67 |
| 4,953,202 | 8/1990 | Newell .................... 379/188 |
| 4,965,459 | 10/1990 | Murray .................... 379/200 |
| 4,975,943 | 12/1990 | Weber ..................... 379/361 |
| 4,980,910 | 12/1990 | Oba ....................... 379/354 |
| 5,097,502 | 3/1992 | Suzuki .................... 379/354 |
| 5,119,417 | 6/1992 | Suzuki .................... 379/354 |
| 5,134,653 | 7/1992 | Satomi .................... 379/355 |
| 5,200,995 | 4/1993 | Gaukel et al. ............ 379/200 |
| 5,268,959 | 12/1993 | Hong ...................... 379/355 |
| 5,471,524 | 11/1995 | Colvin et al. ............ 379/188 |

FOREIGN PATENT DOCUMENTS 681361  10/1992  Australia .

*Primary Examiner*—Dwayne Bost
*Assistant Examiner*—Thomas F. Presson
*Attorney, Agent, or Firm*—Young & Thompson

[57] ABSTRACT

A telephone dialling code processor intercepts outgoing dialling codes such as tones or pulses from a telephone terminal or the like and if the sequence matches a stored sequence it transmits a modified sequence of tones or pulses so that for example a telephone exchange is caused to make the connection along an alternative path or to provide enhanced services. Block 105 monitors the line condition along with block 109 which senses line current in the telephone line 112 and thus the state of the telephone terminal. A muting circuit 101 is used to interrupt or nullify the original dialling tones, a dial tone decoder/receiver 110, storage of predetermined dialling sequences is at 103, a dialling tone encoder/generator 106 reconstructs a replacement dialling sequence and all are controlled by a microprocessor 107 with program memory. Internal power can be derived from the telephone line by 102. The processor optionally may also provide for toll barring, modem-like communications, telephone line testing, call detail recording, raising of alarms, and the like.

7 Claims, 8 Drawing Sheets

| Digits Dialled | Digits Sent to the Exchange |
|---|---|
| 000 xx.. | 000 xx.. |
| 00 xx.. | 050 1 xx.. |
| 01 xx.. | 01 xx.. |
| 028 xx.. | 050 028 xx.. |
| 02 xx.. | 02 xx.. |
| 03 xx.. | 050 03 xx.. |
| 04 xx.. | 050 04 xx.. |
| 05 xx.. | 05 xx.. |
| 06 xx.. | 050 06 xx.. |
| 07 xx.. | 050 07 xx.. |
| 0800 xx.. | 0800 xx.. |
| 083 xx.. | 083 xx.. |
| 087 xx.. | 087 xx.. |
| 08 xx.. | 050 08 xx.. |
| 0900 xx.. | 0900 xx.. |
| 09 xx.. | 050 09 xx.. |

5,710,808

TELEPHONE DIALLING CODE PROCESSOR

BACKGROUND OF THE INVENTION

1. Field of the Invention

This invention relates to the field of telecommunications and telephone equipment, particularly to that used with public switched telephone networks, and more particularly to means associated with the act of telephone dialling in order to facilitate a desired connection.

DEFINITIONS

BT British Telecom—includes connector standards.
DTMF Dual tone multi-frequency—a kind of dial code.
PABX Private automatic branch exchange—such as one in an office.
PIN Personal identification number—a numeric password.
PSTN PubLic switched telephone network.

2. Description of the Related Art

Legislation in certain countries (such as New Zealand and the United Kingdom) has come to allow competition in telecommunications, such as in the operation of alternative providers of telecommunications services such as trunk calls in a public switched telephone network (PSTN). For possibly technical reasons those wishing to use alternative services generally have to dial extra digits over those needed to use the original provider's services in order to access them, such as "050" (NZ, UK) or "1414" (Australia). A niche has appeared in the market of telecommunications accessories for a device that can automatically provide those prefix codes in a dialling sequence, so that the person does not have to remember to provide them. One estimate is that up to 30% of the alternative provider's business may be lost as a result of that extra complexity.

There is therefore a requirement to be able to modify and restrict telephone numbers dialled by subscribers, so that their access to the network can be re-routed, blocked, or otherwise altered—as for access to enhanced services such as client billing.

Equipment capable of performing suitable processes on a telephone terminal (including a fax, telex machine, computer modem, etc) should be able to (1) recognise when dialling is being done, (2) be able to match a sequence against a list of stored numbers, (3) prevent the original sequence from being sent to the PSTN, and (4) send a modified sequence to the PSTN. This equipment should be invisible to the telephone network so that it causes no significant loading of lines or power supplies, distortion of sounds, alteration of line voltage, ringing voltage, line impedance, or other effects on normal telephone operation.

Previous attempts to provide this type of equipment have used electromechanical equipment such as relays to switch the subscriber's line onto a temporary holding circuit, recognise the dialling sequence, modify it if required, and send unmodified or modified numbers to the PSTN. Electromechanical relays require an external power supply, while semiconductor-based relays cost several times as much as electromechanical relays. This kind of equipment also may require isolating transformers and as a result is large, noisy, expensive and imposes dialling delays.

There is also a need for a device to add a constant and possibly confidential series of numbers to a dialled telephone number, particularly in cases where a business may wish to have a secret number for accessing a leased trunk line or some other service that is connected to the PSTN. Another application is for a device capable of providing a personal identification number so that telephone charges may be correctly attributed.

Yet another application is in barring the making of trunk and international calls from a residential telephone—for which toll-barring is otherwise difficult—so that large accounts will not materialise.

There is also a requirement for an automatic dialling device for telephones, so that (to take one example) an activated burglar alarm linked to a telephone connected to a public switched telephone network (PSTN) can cause a certain telephone number to be rung.

If a device incorporating a microprocessor could be made to include a successful implementation of a dialling code processor, it could also be provided with flexibility for other, optional applications such as these.

OBJECT OF THE INVENTION

It is an object of the present invention to provide an improved system for the dialling of telephone numbers, or one which will at least provide the public with a useful choice.

SUMMARY OF THE INVENTION

In one aspect the invention provides a telephone dialling code processor capable of being located between a telephone dialler and a telephone network, to detect and intercept an original dialling code produced within the telephone, characterised in that the processor includes means to detect and decode said original dialling code, means to store said original dialling code, means to optionally block part or all of the original dialling code, and means to control the output to the telephone network.

Preferably the means to control the output includes means to generate one or more substitute dialling codes and cause the resulting combination of output dialling codes to be passed to the telephone network.

Preferably the means to detect and decode said original dialling code includes means to compare the decoded signals against one or more tables of pre-loaded combinations, and means to regenerate and send the same, or a different sequence of signals depending on the results of the comparison, as the output dialling code, meanwhile interrupting the passage of the original dialling code from the original source to the exchange or telephone network.

Preferably it includes at least one solid-state muting circuit capable, when externally commanded, of interrupting signals passing along a telephone line and which can be powered from the telephone line.

More preferably the different dialling sequence comprises first a portion of the original sequence, then a portion of a sequence derived from an internal memory, and then a further portion of the original sequence.

In a particularly preferred form the processor comprises a device having an input which may be connected to a telephone terminal or to the output of a PABX, and an output which may connected to the outgoing telephone line (or lines) and includes at least one solid-state muting circuit capable, when externally commanded, of interrupting signals passing along a telephone line and which can be powered from the telephone line or lines.

Preferably the means to control the output to the telephone network includes means to interrupt a telephone dialling sequence which is not permitted at a certain site, by decoding the dialling code sequence, and searching for forbidden codes, and activating the blocking means if the dialling sequence matches a forbidden code.

In another aspect the invention provides a device which may be plugged into a jack point of a telephone network and which has the capacity to generate or to modify a dialling code sequence characterised in that it creates a predetermined dialling sequence and transmits the dialling sequence using solid-state electronics as the active and switching devices.

Preferably the device is powered from the telephone network.

In a related aspect the invention provides a means, located between a telephone and a telephonic network, to detect and intercept an original dialling code produced within the telephone, to decode and store said dialling code, to optionally block part or all of the original dialling code, and to generate one or more substitute dialling codes and cause the resulting combination of dialling codes to be passed to the telephone network, characterised in that it uses solid-state electronic devices as the active and switching devices.

Optionally the invention may be used with other telecommunications terminal devices such as a telex or a facsimile machine, or modem devices.

Preferably the dialling code comprises a DTMF code. Alternatively it may use a pulse-dialling or interrupted current-loop code.

In another aspect the invention provides a means to interrupt a telephone dialling sequence which is not permitted at a certain site, by decoding the dialling code sequence, and searching for initial codes characteristic of trunk calls.

In a further aspect the invention provides means to automatically ring out to the telephone network using a predetermined dialling sequence on activation by an external signal.

In a yet further aspect the invention provides a method for establishing a communication link through a preselected carrier medium.

BRIEF DESCRIPTION OF THE DRAWINGS

The following is a description of a preferred form of the invention, given by way of example only, with reference to the accompanying diagrams.

DESCRIPTION OF THE PREFERRED EMBODIMENT

Figure 1:
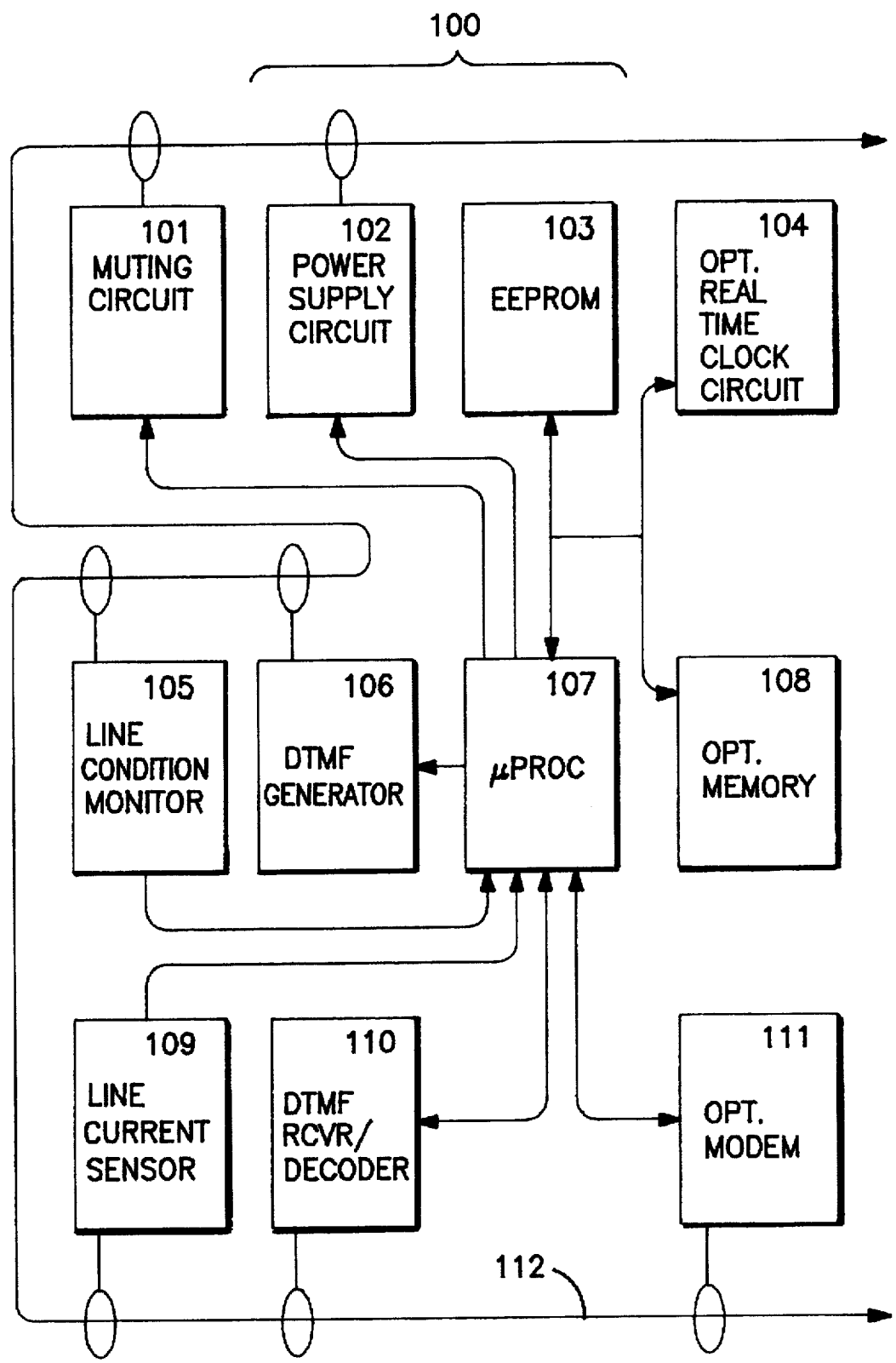
FIG. 1: is a block diagram of the invention, illustrating connections to a central microprocessor.

Conceptually the device intercepts dialling tones (or pulses) from a telephone terminal or the like and inserts extra dialling tones into any sequences which match internally stored sequences, so that the telephone exchange is caused for example to make the connection along an alternative path or to provide enhanced services—or optionally local actions may be taken such as a call-detail recording or a toll-barring function.

The device acts as a first-in, first-out buffer for dialling codes; preferably but not essentially using the standard DTMF tones, with the ability to modify—i.e. to add extra codes, to subtract tones, to replace one or more tones within an internal register or even to abort the connection, depending on the combination of tones contained within the buffer and whether or not they are recognised as matching some internally stored sequence. The device may be used with pulse dialling systems, although it may be observed that these are of diminishing popularity.

In general a dialled code will be totally intercepted, blocked from further transmission into the telephone network (PSTN), converted into numerical form (e.g. one digit for each dialled digit) and regenerated internally for transmission after combination with a string of predetermined digits—usually but not necessarily extra digits.

For example in the case of a device set up to automatically use an alternative trunk call carrier for which an extra prefix is otherwise dialled by the person, an example dialled number 063572806 will be intercepted as a result of detecting that the initial digit is a zero, and converted into 050063572806 for re-transmission by one preferred embodiment. In other words the device has added the tones corresponding to "500" near the beginning of the initial sequence.

This addition is suitable for use with the alternative telecommunications carrier "CLEAR" in New Zealand and also the carrier "MERCURY" in the United Kingdom. It has the effect of re-routing the trunk call being made through their system rather than through a competitor's system. On the other hand an Australian carrier requires the prefix "1414" therefore the device will preferably test the initial digit as a "1" and then the second as a "4" or at least not another "1", and would actually insert "1414063572806".

Preferably a dedicated microprocessor with a suitable non-volatile memory will be used to carry out the various desired functions. Clearly a buffer for tones will work better if the tones are first decoded into microprocessor-compatible numbers—such as one number for each dialled digit.

While the embodiments described herein have been built largely with discrete components, economic considerations may result in much or all of the invention being constructed as one or a small number of dedicated integrated circuits.

One specific embodiment provides hardware means to automatically dial the New Zealand alternative trunk carrier, "CLEAR", by adding the digits "5", "0", and "0" after detecting an initial "0" dialled by a person, while in all other respects remaining functionally transparent to the user and to the equipment. Some coding for this purpose is illustrated in the table, FIG. 4. Note for example that the system differentiates between an "0800" free call number and an "08" prefix; adding the extra sequence to the latter but not to the former combination.

There may be situations in which the device is required to delete some of a string of dialing codes rather than the more usual situation of adding to a string.

Preferably this embodiment can trap codes/numbers selecting generic trunk calls and replace them with the desired prefixes. Alternatively it may be used as a kind of toll-bar for a residential telephone in the manner of toll bars implemented within local exchanges—such as within PABX exchanges—to prevent unauthorised calls being made. A further option is to link into more complex protocols for making trunk calls such as one in which a first local access number is followed by a personal identification number, then after a further dial tone a further special access number can be followed by the destination number. This action is available with the present invention.

An optional use for this device is to provide extra telephone services ("enhanced services") at certain terminals, in circumstances where the user may not be aware of the presence of the device, let alone be able to record the extra tones used and use them later in a non-approved way. Enhanced services may include client account billing, or account code access services such as use of a leased tie line to another city or country. Another enhanced service is one in which a reasonably long and secure personal identification number may be used from any calling site yet the charge for the call will be attributed to the user's base telephone—a kind of automatically transferred charge call. In that case a person may carry the device around in a convenient box, and insert it into a telephone jackpoint when required.

Preferably this embodiment of the invention can be plugged in between the telephone and a wall socket, using the standard "BT" or equivalent telephone connectors. This is shown as 300 in FIG. 3. Alternatively it may be concealed within a telephone, or in or adjacent to a PABX control box, or elsewhere. In the case of toll barring applications, it is preferable that the device be not easily bypassed. Preferably the embodiment allows the passage of DC line power to the telephone, will not obstruct the peak AC voltages of ringing, will not be damaged by voltage surges, and yet will allow the passage of both dialling and spoken information from the telephone.

In New Zealand the regulations allow a three-volt drop across equipment interposed in series whereas in the United Kingdom the maximum level is 2 volts.

FIG. 1 illustrates a number of blocks that are combined to form one implementation 100—by no means a minimal configuration—of this invention. Those blocks that are themselves linked to the telephone wiring (line 112) are drawn with a line to an ellipse to indicate that linkage. The blocks are wired to a microprocessor 107 which has the function of controlling the operation of the embodiment. Preferably the power supply for this device is taken from the telephone line at 102; many components having low power consumption that are currently available have been designed for such a supply without adverse effects.

In the event of power not being available from the telephone line it may be powered from an external supply or an internal battery.

Figure 2:
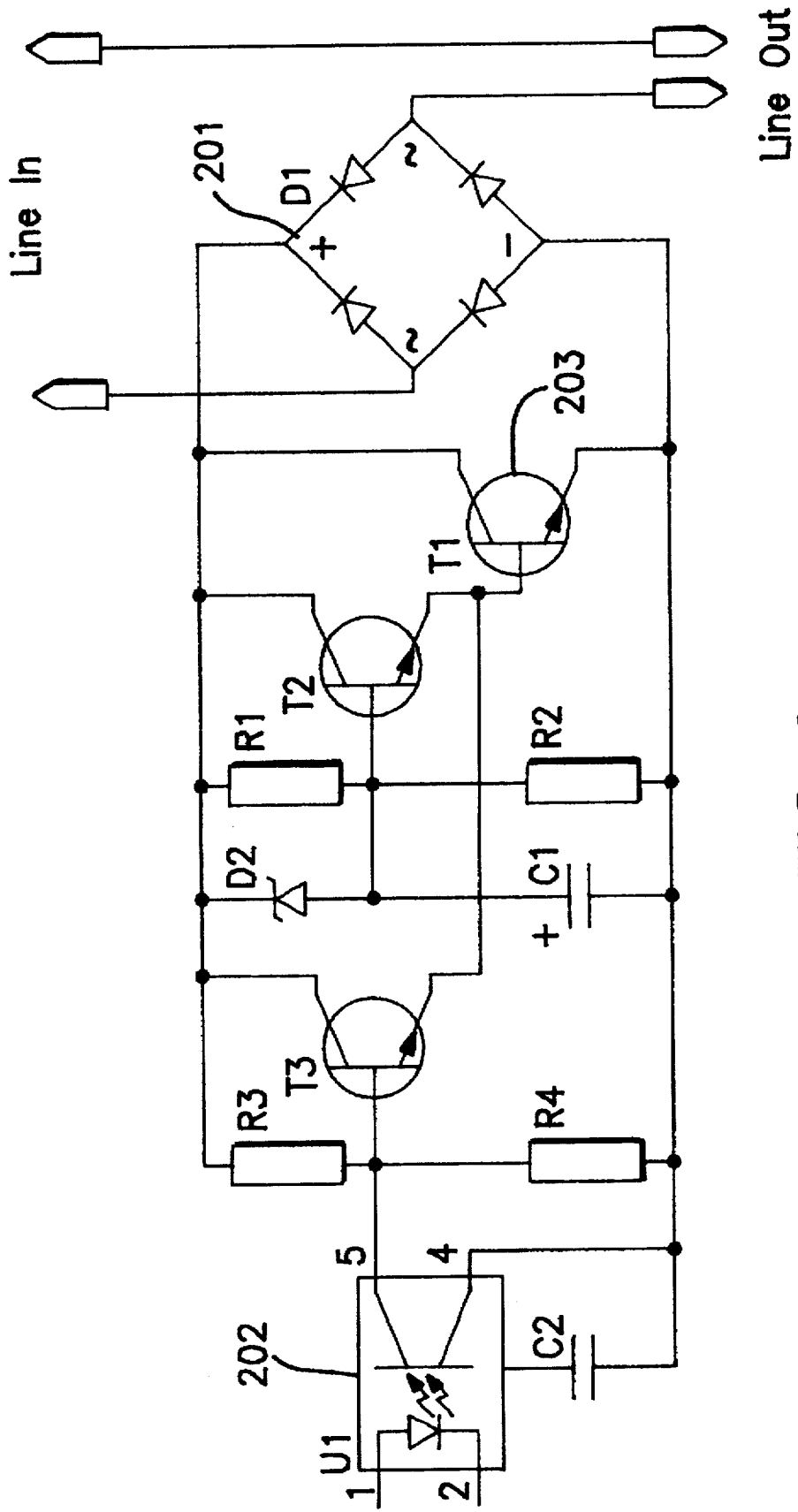
FIG. 2: is a circuit diagram of block 101 of FIG. 1.

The DTMF cancellation circuit (101) and FIG. 2 may be controlled by the microprocessor port line, optionally but not necessarily via an opto-coupler to present either a high or a low impedance to AC signals. It is placed in series with either leg of the PSTN line (it is not sensitive to polarity reversals) where it may be used to gate low-level AC signals. The gating function provides a substantially inaudible transition from muted to unmuted states. It presents a low impedance to DC signals and has minimal effect on high voltage ring signals. The circuit uses a bridge rectifier 201 to steer line current of either polarity into the correct polarity for the NPN transistor circuit used. The circuit is a transistor switch, energised by the microprocessor (107) via the opto coupler U1 (202)—used for isolation purposes—in which the transistor T1 (203) is held in its linear region by R1 and R2. It is presented with filtered audio via T2 in the muted state, or with unfiltered audio via T3 in the unmuted state. Diode D2 improves the initial transient performance by quickly charging C1. It also protects against over-voltage conditions across or within the circuit.

The power supply and management circuit (102) draws power from the telephone line to feed the circuitry of this invention. It presents a high impedance to AC signals so that it does not affect the impedance of the line. Power can be controlled by the Line Current Sense unit (109) or by the microprocessor, perhaps also by the real-time clock or by an external device. The circuit is independent of voltage polarity. If the dependent telephone (or other equipment) is off-hook, this device maintains a correct line impedance to the PSTN. This circuit preferably includes protection against potentially harmful voltage surges.

Figures 3, 4:
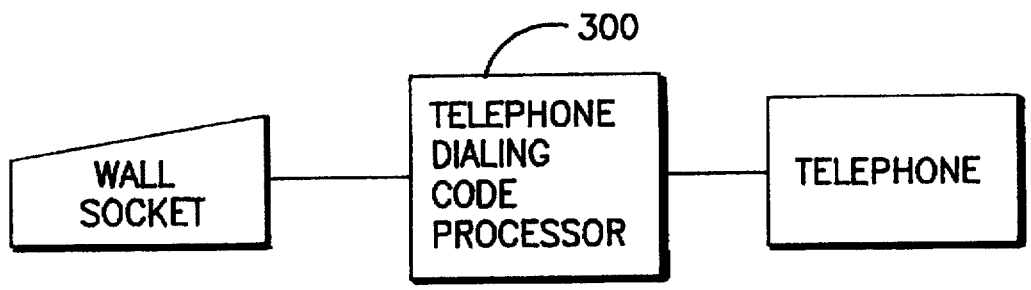
FIG. 3: is an illustration of the present invention in use with a telephone.
FIG. 4: table of actions as may be contained within block 103 of FIG. 1.

The EEprom (electrically erasable programmable read-only memory) block (103) is used for storage of data during periods when no power is applied. It may include site-specific constants, such as what numbers are to be inserted, and it—and/or the optional block 108 may include temporary storage of past call activity such as the date and time, the station called, and duration of each call. Its primary purpose is to store a site-specific table of input codes and required output codes, as illustrated in FIG. 4.

The optional real-time clock circuit (104) is provided primarily to allow date-stamping of records of activity, though it can also initiate periodic calling sequences made autonomously by this unit, such as for downloading call data, uploading new tables of dialling numbers, or testing the line.

The line current sense block (109) detects the current drawn by the dependent telephone. When this rises to a level indicating that the telephone is in an off-hook state, this circuit causes power derived from the line voltage to be applied throughout the invention. This circuit preferably will not respond to current drawn by ring detectors elsewhere on the line. Once power has been applied to the microprocessor 107, it executes a suitable program (see FIG. 5), preferably taking over control of the power management so that transient interruptions in the line current or pulse dialling activity do not cause interruptions, and for an orderly shutdown after the call has ended. This invention provides for optional call logging, and network performance logging, using a non-volatile memory and a communications modem.

The DTMF and tone generation circuit (106) is intended for the generation of DTMF and modem-compatible tones, and may also generate test tones. Preferably it is under direct control of the microprocessor (107). Preferably it includes line termination during operation, at the standard 600 ohm impedance (or a BT3 load) and emits tones having a standardised level.

The microprocessor controller (107) provides an overall management function, according to a stored program contained within an associated non-volatile memory which may also make use of variables contained with electrically alterable memories (EEProms). This microprocessor may be an 8-bit Philips type PCD 3343 integrated circuit which has been designed for telephony applications and includes a 3K store for 8048-type instructions.

The preferred CDR EEprom circuit (108) is intended for call detail recording, i.e. call duration, number called, network performance, etc.

The line monitoring circuit (105) provides a peripheral transducer to the microprocessor which may be used to monitor the line status, dial tones, busy tones, and ringing tones, and to detect incoming test tones.

The DTMF receiver circuit (110) monitors the line for (a) tones generated by the dependent telephone in order for the microprocessor to determine which number is being dialled, and (b) for reception of external commands having the effect of causing system or user functions within the device to be programmed or re-programmed, and to receive other information via the PSTN.

The 1200 Bd modem circuit (111) may be a separate device, or it may be simulated by software along with a suitable tone emitter chip (which may be the above DTMF generator circuit as in FIG. 8) and suitable tone receiver means (which may be the above DTMF tone receiver circuit). It is primarily intended for reporting on system usage, network operation, and perhaps, as described below, for reconfiguration in situ from a remote site. Other modem speeds apart from 1200 Baud, and other tone sets, either standard or proprietary, are also possible.

Further options among many possible include external power supplies, and external control lines (such as for a burglar alarm or a life-support system for an invalid or the like), a visible clock display, an alarm display, and/or a call details display.

Of course, a minimised unit having a single function—such as insertion of "5""0""0""0" after a first-dialled "0" may be made much more simply than as indicated in the description of this preferred embodiment. Many of the blocks may be deleted.

Figure 5:
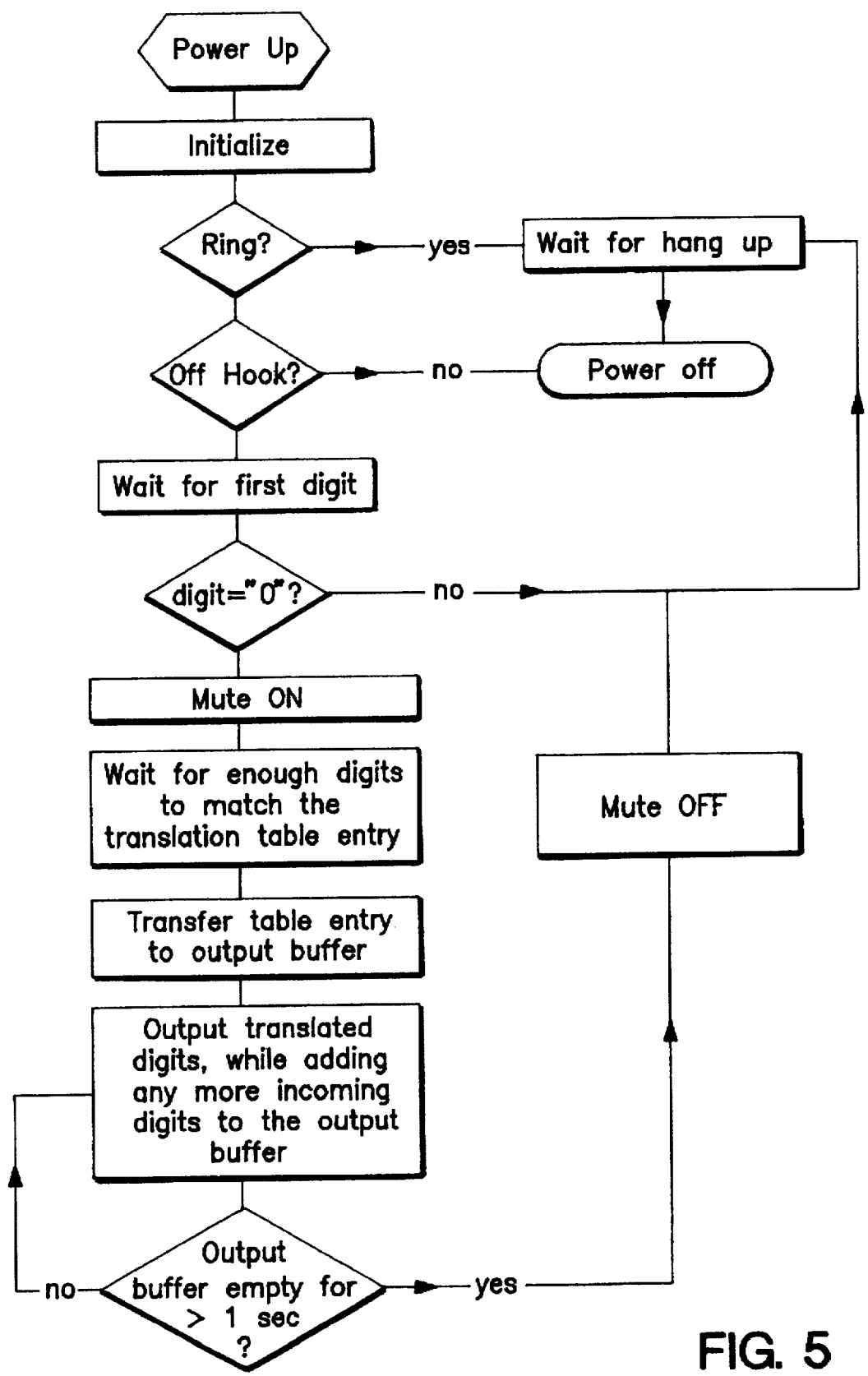
FIG. 5: is a block diagram of the microprocessor flow chart.
Figure 6:
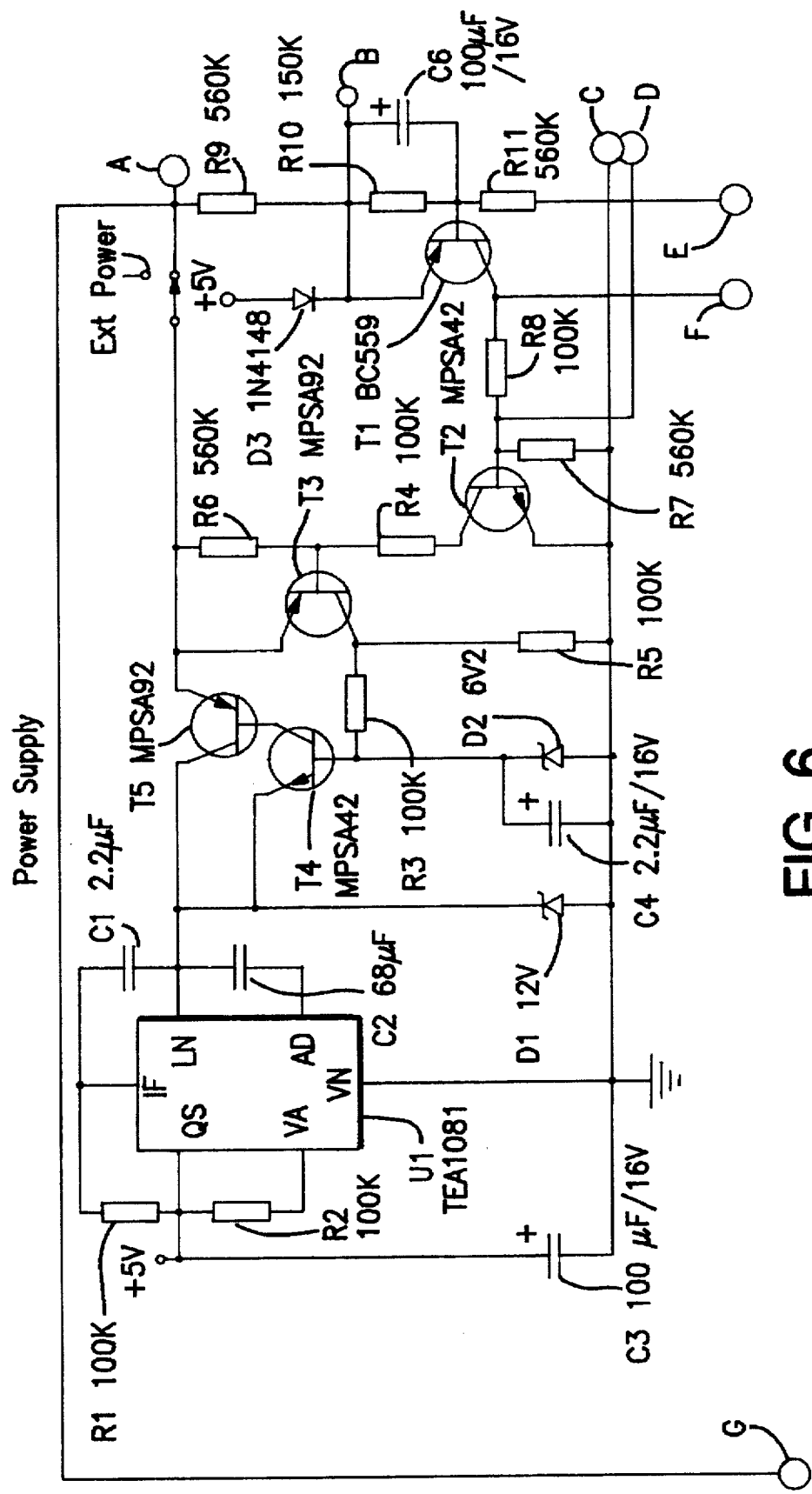
FIG. 6: is the upper left portion of a circuit diagram for the present invention.
Figure 7:
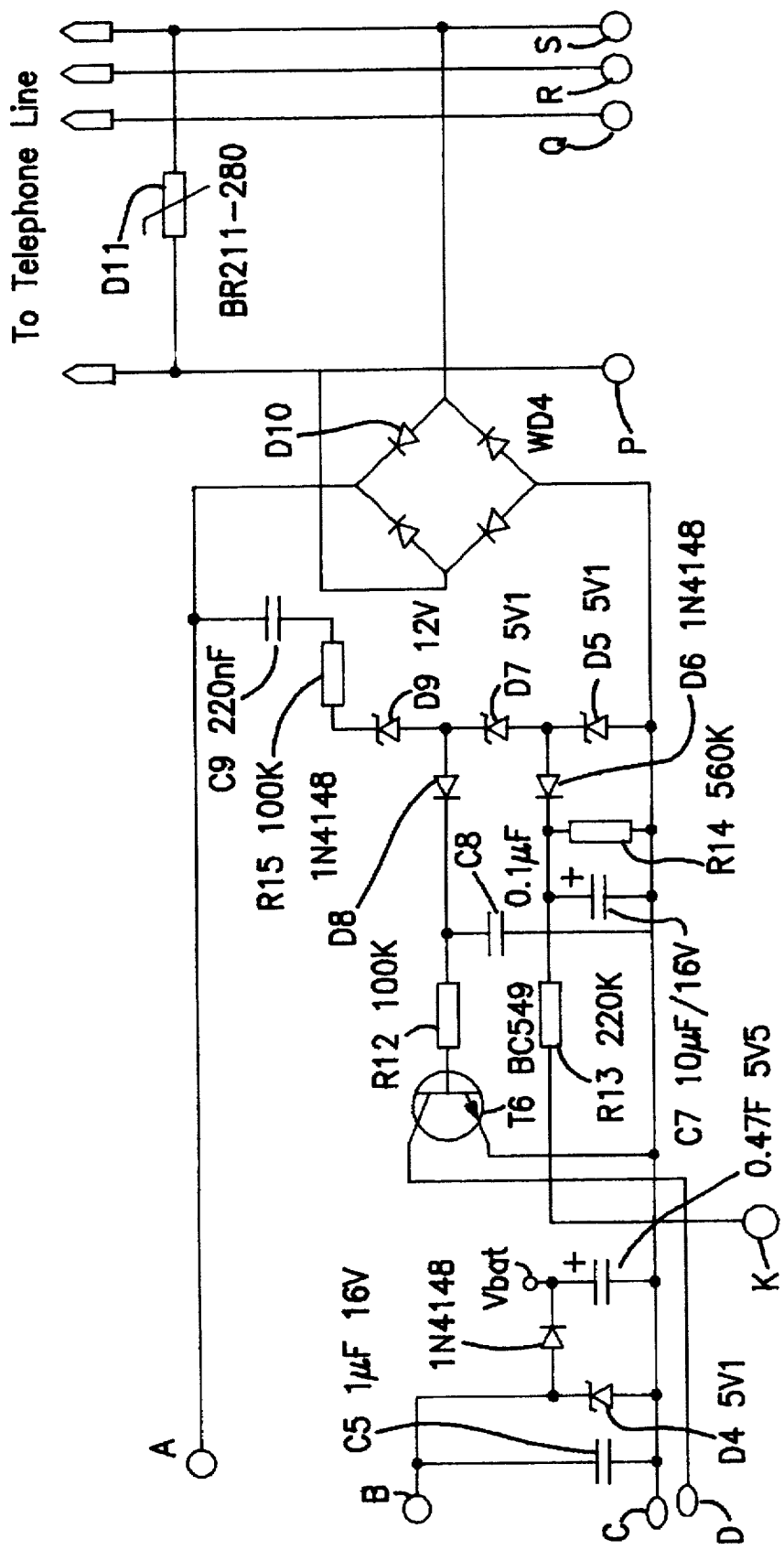
Fig. 7: the upper right portion of a circuit diagram for the present invention.

The flow chart of FIG. 5 illustrates the functions of the microprocessor. (This is the "insert 500" version.) Its first decision box—is a "Ring" occurring? —puts it into the wait-for-hangup mode as the event in progress is a dialing up from outside. The second decision box "Off Hook" detects whether the receiver is lifted and will go into its quiescent state if the phone is not in use. When digits are being dialled, the remainder of the flow chart is exercised, starting with waiting for the first digit. If the first digit is not a zero, the device deactivates again.

If the first digit is a zero, the isolated and separately line-powered mute circuit (FIG. 2 and top part of FIG. 9) is activated. As succeeding digits are dialled, the microprocessor matches the string against its translation table held in memory and once a series (of indeterminate length but typically 2 to 5 digits) is completed the contents of the translation table are passed to the output buffer and transmitted via the tone generator relatively quickly so that the person dialling is not generally aware of the activity of the device. Preferably the entire DTMF sequence is passed through the device, i.e. each tone is received, converted into a computer byte, re-generated as a tone, and transmitted to the telephone line so that no tone is lost. Thus the last decision box, testing for an empty buffer for more than one second, is used to either go back to get more internally stored digits or else to deactivate this device (via the Mute OFF box) so that either a slow dialler can continue normally or if the dialling sequence has actually finished the telephone connection can now be made.

The circuit of FIG. 2 was designed to meet certain requirements:

(a) Provide a DC path between the PSTN and the telephone terminal or dialling equipment, in order to power the telephone and correctly bias any holding circuitry at the exchange (including less than the maximum permissible series voltage drop), (b) provide an AC path for high voltages, capable of passing any ringing voltages to the subscriber's equipment, and (c) provide a controllable AC path at low voltages in order to restrict dialled digits from reaching the PSTN while the device is evaluating them, then allowing normal operation for the rest of the duration of the call.

Referring to FIG. 2, bridge rectifier D1 steers current so that the device is not sensitive to polarity and may be put in either leg of the line. Opto coupler U1 provides for a command signal to be sent to the circuit so that it can either pass or block low-level AC signals. Transistors T2 and T3 provide an "OR" gate by virtue of their common emitter configuration so that the flow of base current in either will cause current to flow in the base of T1. T3 is driven off by the opto coupler. When on it causes T1 to turn hard on (or saturate) and thus is in a non-mute state. T2 and T1 form a Darlington pair which is held in its linear mode unless T3 is activated. By default T3 is active and the circuit will not mute, and so the telephone service is not affected.

Figure 8:
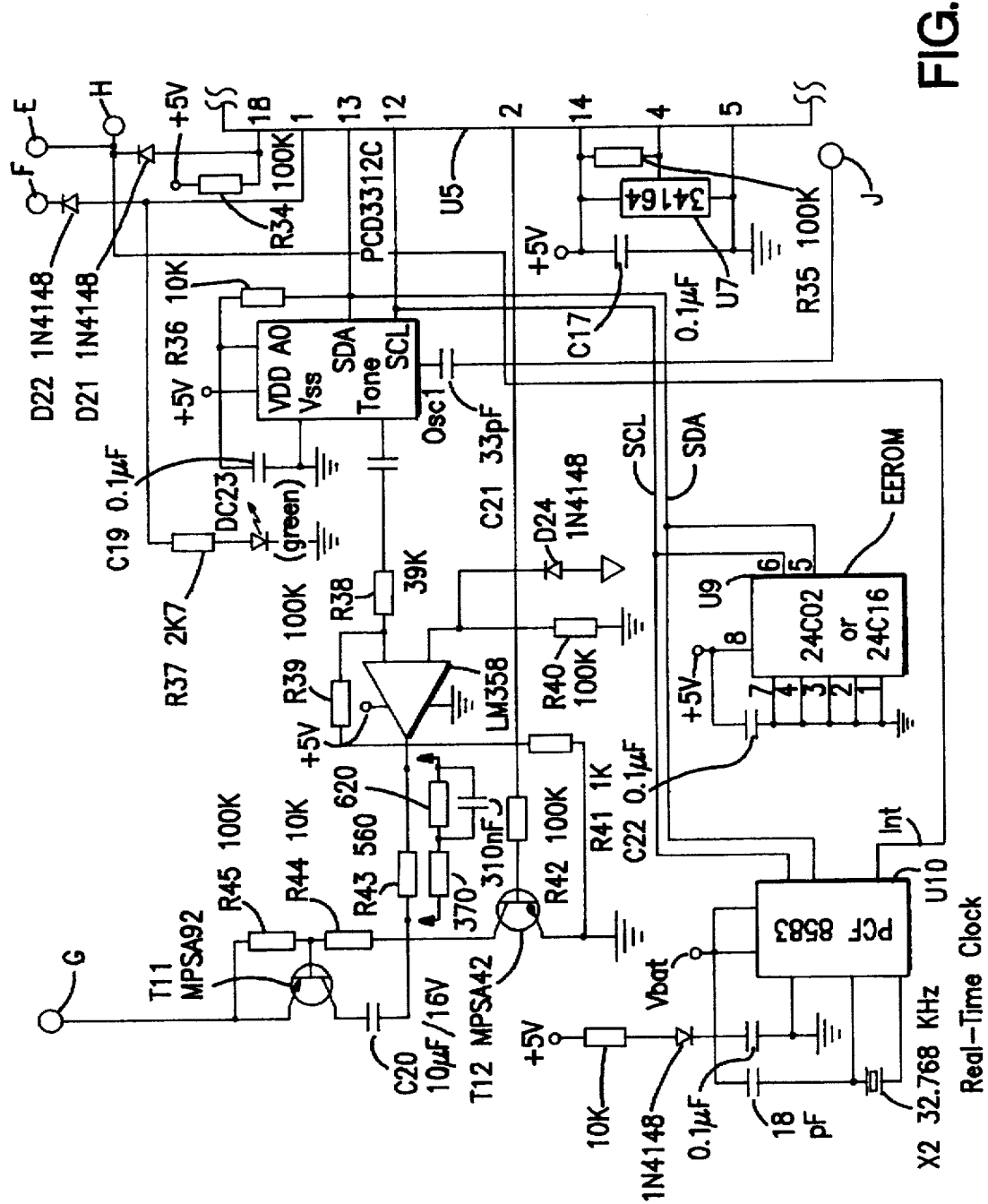
FIG. 8: is the lower left portion of a circuit diagram for the present invention.
Figure 9:
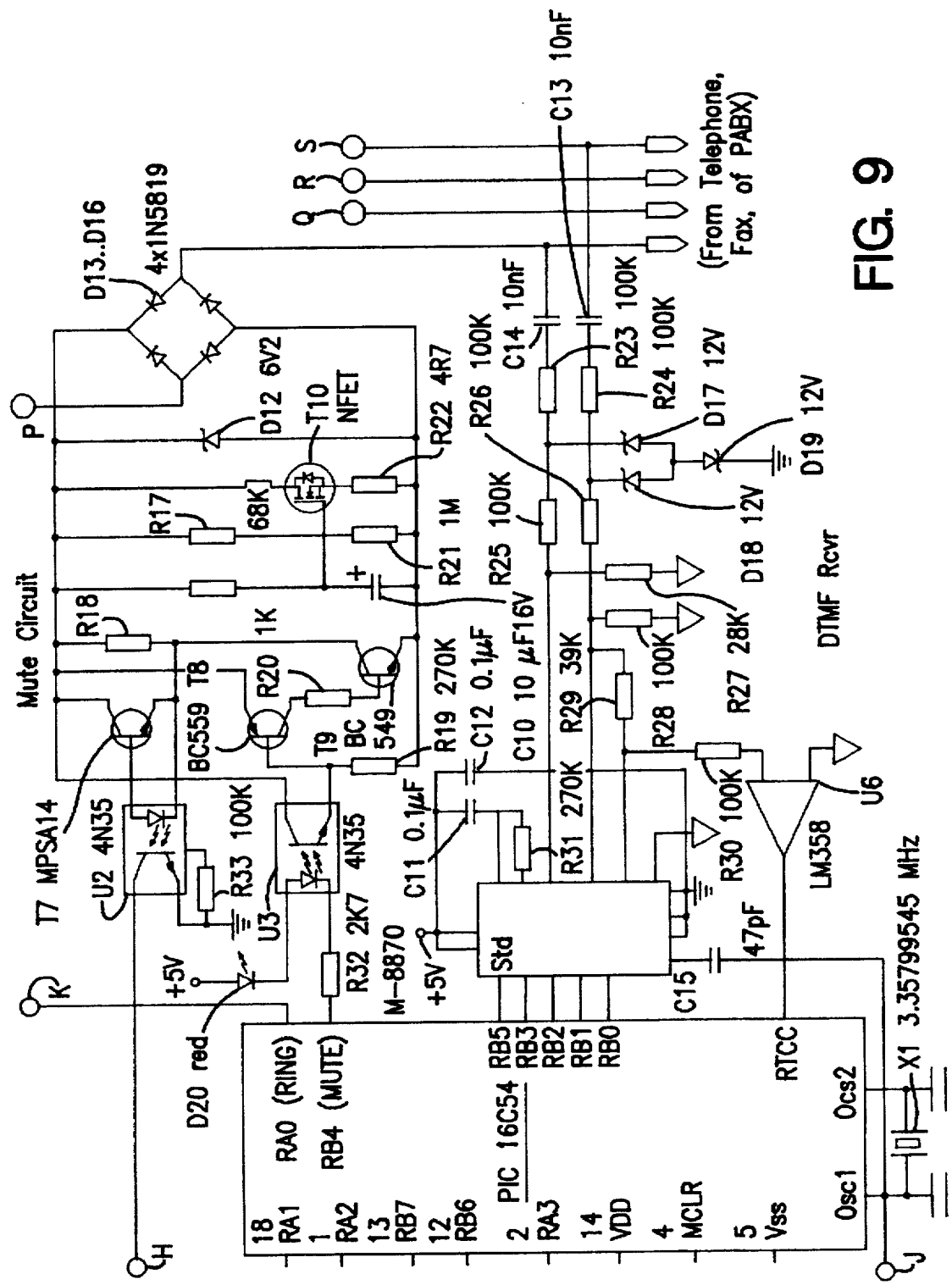
FIG. 9: is the lower right portion of a circuit diagram for the present invention.

A commercially used version of the above device is illustrated in the four pages entitled FIGS. 6, 7, 8 and 9. These pages are in fact a single circuit joined in two ways: either by means of the pairs of off-page circle connectors labelled A,B,C D,E,F,G,H,J,P,Q,R and S, or along the left side of the microprocessor (here shown as a PIC 16C54) where correspondence between FIGS. 8 and 9 is indicated by the numbers 18,1,13,12,2,14,4, and 5. A masked PCD3351 (Philips) is an alternative microprocessor.

The power supply (FIGS. 6 and 7) uses a TEA1081 integrated circuit with supporting circuitry to generate 5 volts and also a battery backup voltage (actually a 0.47F capacitor) for use by the rest of the circuit, commencing with a bridge-steered DC input taken from the telephone line at W04. The microprocessor can operate at 3.5V.

The real-time clock circuit (see chip U10-PCF8583 which is an option) uses the battery backup voltage. This section may be used for optional call logging purposes and is conveniently connected to the microprocessor via the SDA and SCL lines of a conventional "I²C" interface as defined by Philips NV. The internal random-access memory of U10 may also be used. One application for this section of the circuit is to cause the device to make periodic automatic calls to a host circuit, and either send digital data to, or receive digital data from, a possibly remote service number. Thus these devices need not be visited for field programming. It is preferable that each unit initiates such calls, so that the invention need not be required to determine the nature of any incoming call. The interrupt line "Int" may be used to initiate such a call from the real-time clock.

Conveniently, electrically erasable read-only memory is also supported by the I²C bus. Chip U9 (for which various size options are available) provides this memory in a non-volatile yet alterable form, as the numerical table of stimuli and responses that the device provides to the user.

FIG. 8 also includes the I²C tone generator chip PCD 3312C and the output driver (a LM358 operational amplifier followed by an output stage (T11 and T12). Such tone generator chips include a number of predetermined DTMF and modem frequencies.

FIG. 9 illustrates the microprocessor which is a type (PIC 16C54) optimised for low-power telecommunications purposes with an internal program memory. Inputs to this chip include decoded DTMF information from the decoder chip M-8870 and ring and RTCC lines. (RTCC is a name for a counter input for this type of microprocessor, here used as a zero-crossing detector—an analogue input.)

The mute circuit itself (top right) is substantially as previously described with reference to FIG. 2 although it employs a preferred N-channel field effect transistor (N-FET). In this case, a current through the opto isolator U3 causes base current to halt in T8 and hence in T9, so that the voltage across the entire mute circuit can rise and thus cause the N-FET to operate in its linear mode. Capacitor C10 filters AC from the gate of the FET. This circuit has no significant effect on speech and data transmission when not muted—an insertion loss of 0.5 dB approximately, yet when in its mute mode its insertion loss is typically 30 dB which is satisfactory for telecommunications purposes.

VARIATIONS

1. Toll-barring Device

A toll-barring device is one which is capable of determining that a user is attempting to call a number on a previously determined list of forbidden or non-approved numbers, and preventing the connection being made. A preferred mode of use is to simply not transmit any tones which lead to that call being connected. Optionally it could transmit a different set of call tones or even a nonesense set (sending "####" will abort the call immediately), and the mute circuit may be kept operational for a longer period. The list of prohibited numbers might be programmed into memory within the device during manufacture or could be downloaded from a host processor at a service number (see later). Given a system of passwords or personal identification numbers, it would also be possible to program the device from the attached telephone by following a programming procedure.

Alternatively this device could block all outgoing calls unless the user first entered a PIN.

2. Alarm Raising

An external interrupt line to the microprocessor may be connected to a burglar alarm or the like. A simple interrupt routine will cause the circuit to automatically dial a predetermined number and optionally transmit further tones or other signals to indicate the nature of the alarm condition.

3. Line Quality—Periodic Tests

Another use for this device; one which needs no alteration to the hardware other than to include the optional real-time clock, is as a tester for PSTN line quality, in which a telephone company that intends to provide a proactive quality maintenance service does so by arranging that each of these devices dials a test number from time to time and transmits a suitable pre-defined series of test tones over the line under test from its internal tone generator to a central test facility. Properties such as echo, frequency response and line noise can be assessed in this way. Preferably these tests are carried out during the night so that users do not find their telephones are not available for use, and preferably test calls are not charged to the user's account.

4. Personal Identification Number (PIN) Provider

In this example, a person wishing to automatically have a telephone charge transferred to some other number would carry a device about and insert it in series with a telephone (or modem or other device) and the telecommunications wall socket in order to append his PIN and perhaps additional enabling codes as well to a dialled call. When he dials a chargeable number (generally one beginning with a zero) the device will intercept the dialling code, store it, insert a PIN number, and retransmit it so that this type of enhanced service can be provided by the telephone company. Storing a PIN inside a device helps to minimise unwanted duplication of the number (as could happen if it was written down), and the device is capable of accepting an updated number from time to time. The number may be of indefinite length (up to at last 100 digits), to reduce the risk of unauthorised use. Again, no hardware modifications to the device are required.

5. Call Detail Recording

In this example the device may be provided with local information output means, such as a liquid-crystal display or a serial interface socket or the like, to dump data collected over a previous period which may include the telephone number called, the date, time, and duration of the call, and optionally an operator identification PIN or password. The internal real-time clock and memory chips are used to supplement data derived from dialling codes. In another version call detail recording may be implemented without local hardware by having a host site equipped to receive modem calls from one or more devices and download the transmitted data to a paper printout, for example. The devices are usually provided with modem chips.

6. Installation Within a Telephone or Similar Device Rather than as a Stand-alone Unit Further preferred embodiments include incorporation of the functional elements of this device within a telephone unit a PABX unit, or a exchange rather than as an in-line adapter, where it may be embodied as extra hardware elements and/or as additional software.

An advantage of this circuit include that it facilitates use of an alternative carrier while being convenient to install. People do not need to remember to dial extra digits. (It is easy to start an account but more difficult to remember to use it). Another advantage; one of many that result from the provision of a computer-controlled muting circuit and tone generator, is that it can provide access to enhanced services. Another is that it can record telephone usage; particular calls initiated from the attached terminal. A further advantage is that it can recognise prohibited codes and block certain calls.

Preferably this embodiment can trap codes/numbers selecting generic trunk calls and replace them with the desired prefixes. Alternatively it may be used as a kind of toll-bar for a residential telephone in the manner of toll bars implemented within local exchanges—such as within PABX exchanges—to prevent unauthorised calls to forbidden calling zones from being made. A further option is to link into more complex protocols for making trunk calls such as one in which a first local access number is followed by a personal identification number, then after a further dial tone a further special access number can be followed by the destination number. This action is available with the present invention.

An optional use for this device is to provide extra telephone services ("enhanced services") at certain terminals, in circumstances where the user may not be aware of the presence of the device, let alone be able to record the extra tones used and use them later in a non-approved way. Enhanced services may include client account billing, or account code access services such as use of a leased tie line to another city or country. Another enhanced service is one in which a reasonably long and secure personal identification number may be used from any calling site yet the charge for the call will be attributed to the user's base telephone—a kind of automatically transferred charge call. In that case a person may carry the circuit around in a convenient box, and insert it into a telephone jackpoint when required.

Finally, it will be appreciated that various alterations and modifications may be made to the foregoing without departing from the scope of this invention as set forth in the claims.

I claim:

1. A telephone dialling code processor for connecting to a telephone line between a telephone network and a telephone terminal having a dialler; the processor processing an original dialling code produced within the telephone terminal, said processor comprising:

a dialling code muting means comprising a solid state circuit for selectively blocking low-voltage AC signals of a type used as dialling codes from passing along said telephone line while simultaneously passing direct current telephone power and passing high voltage AC ring signals, said muting means being powered from the telephone line, dialling code generating means, within said dialling code processor, for generating at least one dialling code, comparison means for comparing original dialling code with at least one table of preloaded combinations, and decision means for using results of the comparison to control the muting means and the dialling code generating means, wherein the original dialling code is completely suppressed and a modified dialling code, if any, sent on to the telephone system, is entirely created by the dialling code generating means.

2. A telephone dialling code processor as claimed in claim 1, wherein said dialling code muting means suppresses at least part of a digit of the original dialling code and comprises signal steering means across the muting means and voltage raising or lowering means to lower or raise the voltage across the suppression means so that when the voltage across the circuit is low, a signal switching device is cut off and is thereby providing a signal insertion loss of at least about 30 dB in a suppressing state, and when the voltage across the suppression means is high, the signal switching device is caused to operate in its linear mode, thereby providing about 0.5 dB insertion loss when in a nonsuppression state, so that, when externally commanded, the dialling code muting means either passes or blocks signals along said telephone line.

3. A telephone dialling code processor as claimed in claim 1, wherein said processor further includes detector means for detecting and decoding said original dialling code, and storage means for storing said original dialling code.

4. A telephone dialling code processor as claimed in claim 1, wherein said decision means comprises means for blocking a dialling code if a telephone dialling sequence including a forbidden code, which is not permitted at a certain site, is detected, so that if the dialling sequence matches the forbidden code it is barred or blocked.

5. A telephone dialling code processor as claimed in claim 1, further comprising a device having an input connectible to one of a telephone terminal and to an output of a PABX, and an output connectible to at least one outgoing telephone line and includes at least one solid state muting circuit for, when externally commanded, blocking signals from passing along said telephone line, said at least one solid state muting circuit being powered from the telephone line.

6. A telephone having a device for selectively blocking signals from passing out from the device and along a telephone line, the device being powered from the telephone line, comprising a telephone dialling code processor for connection to a telephone line between a telephone network and a telephone terminal having a dialler; the processor processing an original dialling code produced within the telephone terminal, said processor comprising:

muting means comprising a solid state circuit for selectively blocking low voltage AC signals of a type used as dialling codes from passing along said telephone line, while simultaneously passing direct current telephone power and passing high voltage AC ring signals, said muting means being powered from said telephone line, dialling code generating means, within said dialling code processor, for generating at least one dialling code, comparison means for comparing original dialling code with at least one table of preloaded combinations, and decision means for using results of the comparison to control the muting means and the dialling code generating means wherein the original dialling code is completely suppressed and a modified dialling code, if any, sent on to the telephone system, is entirely created by the dialling code generating means.

7. A telephone dialling code processor for connecting to a telephone line between a telephone network and a telephone terminal having a dialler; the processor processing an original dialling code produced within the telephone terminal, said processor comprising:

a dialling code muting means comprising a solid state circuit for selectively blocking low-voltage AC signals of a type used as dialling codes from passing along said telephone line while simultaneously passing direct current telephone power and passing high voltage AC ring signals, said muting means being powered from the telephone line, dialling code generating means, within said dialling code processor, for generating at least one dialling code, comparison means for comparing original dialling code with at least one table of preloaded combinations, and decision means for using results of the comparison to control the muting means and the dialling code generating means to modify at least part of the original dialling code so that a resulting combination of original and modified dialling codes is passed to the telephone network, wherein said decision means comprises means for causing the muting means to suppress at least part of a digit of the original dialling code from onwards transmission and comprising means for causing the dialling code generating means to generate a modified dialling code as a replacement for the suppressed part of the original dialling code so that the resulting combination of original and modified dialling codes is passed to the telephone network.

* * * * *